United States Patent Office 3,718,358
Patented Feb. 27, 1973

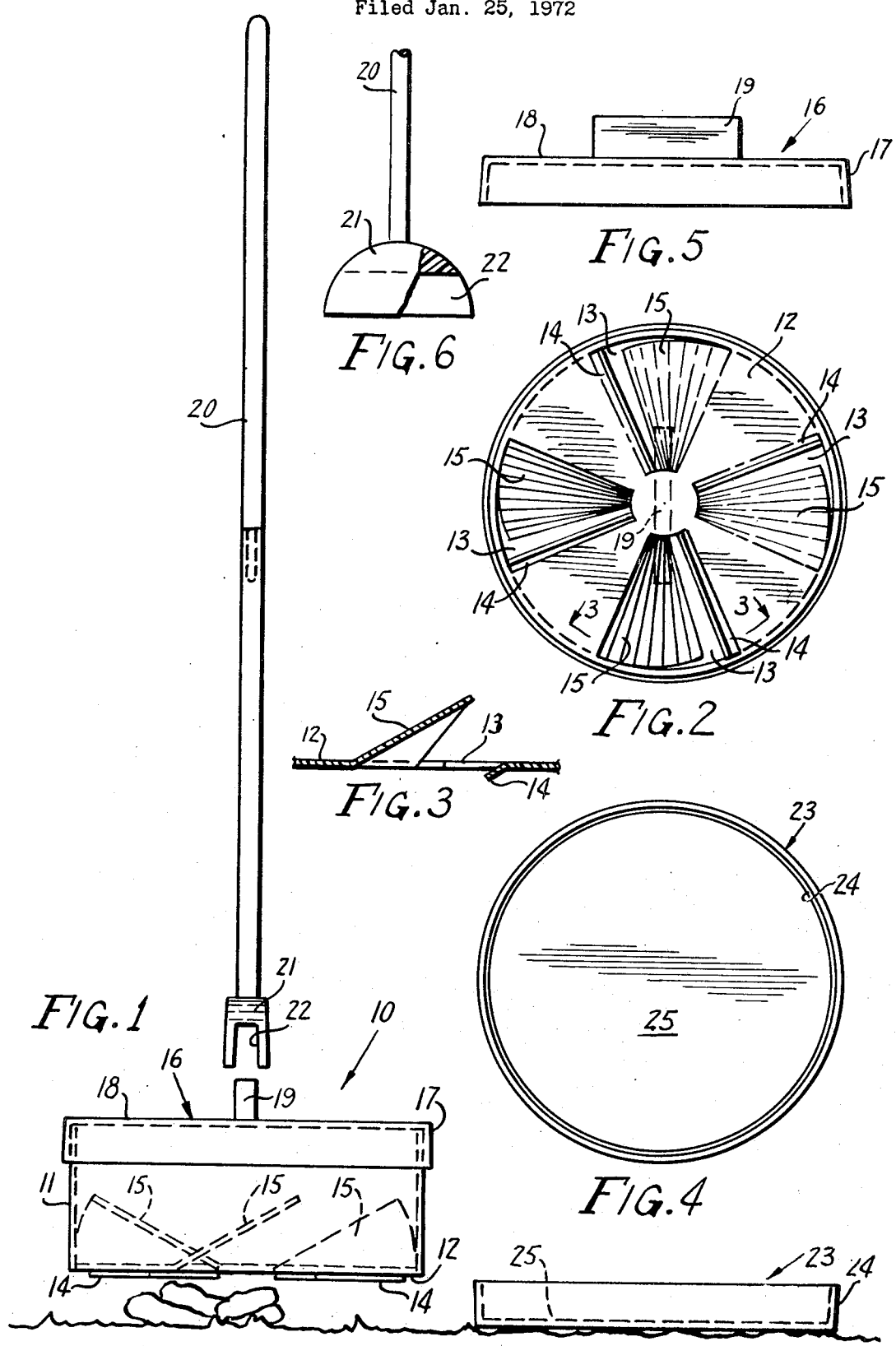

3,718,358
SANITARY COLLECTOR
Thaddeus Ayers, 11 Franklin St., Elmont, N.Y. 11003
Filed Jan. 25, 1972, Ser. No. 220,578
Int. Cl. A47f 13/06
U.S. Cl. 294—19 R     5 Claims

ABSTRACT OF THE DISCLOSURE

A sanitary collector for gathering animal excrement into a disposable container to permit it to be discarded. The disposable container is provided with vanes having projecting scraping edges for scraping the excrement from the ground or other surface upon revolving of the container. A detachable handle is provided for operating the container and a bottom cover is provided for closing the container with the excrement therein prior to disposing of the container.

BACKGROUND OF THE INVENTION

Field of the invention

The present invention relates to disposable sanitary containers for collecting and removing animal excrement.

SUMMARY OF THE INVENTION

The disposable sanitary container comprises a generally cylindrical container shell having a plurality of scraping vanes formed in the bottom wall thereof with their scraping edges arranged radially of the center of the container. A cover for the top of the container is provided with a removable handle and fits the container tight enough so that it can be moved by means of the handle. A bottom cover is provided to close the container prior to its being discarded with the excrement therein.

The primary object of the invention is to provide a disposable sanitary container for animal excrement.

Other objects and advantages will become apparent in the following specification when considered in light of the attached drawings:

BRIEF DESCRIPTION OF THE DRAWINGS

FIG. 1 is a side elevation of the invention;
FIG. 2 is a bottom plan view of the invention;
FIG. 3 is an enlarged fragmentary sectional view taken along the line 3—3 of FIG. 2 looking in the direction of the arrows;
FIG. 4 is a top plan view of the bottom cover;
FIG. 5 is a side elevation of the top cover; and
FIG. 6 is a fragmentary side elevation of the handle shown partially broken away and in section for convenience of illustration.

Referring now to the drawings in detail wherein like reference characters indicate like parts throughout the several figures the reference numeral 10 indicates generally a disposable sanitary container constructed in accordance with the invention.

The disposable sanitary container 10 includes a generally cylindrical wall 11 having a generally circular bottom wall 12 integrally formed thereon.

The bottom wall 12 has a plurality of radial slots 13 extending outwardly from the center portion thereof. The bottom wall 12 has a plurality of downwardly sloping scraper blades 14 formed thereon at the edge of each of the slots 13. On the opposite sides of each of the slots 13 the bottom 12 is provided with upwardly sloping retainer vanes 15 for purposes to be described.

A top cover generally indicated at 16 is provided with a depending cylindrical wall 17 which is adapted to tightly engage over the upper edge of the cylindrical wall 11 to close the container 10. The top cover 16 has a closed top wall 18 with a bar 19 rigidly secured thereto and projecting upwardly therefrom.

An elongate handle 20 is provided with a head 21 on its lower end with a transverse slot 22 extending across the lower portion thereof. The slot 22 is adapted to be pressed over the bar 19 to secure the cover 16 to the handle 20 to permit the container 10 to be moved by means of the handle 20.

A bottom cover indicated generally at 23 has a generally cylindrical side wall 24 which is adapted to tightly engage the side walls 11 of the container 10. A circular bottom wall 25 completes the bottom cover 23 to close the bottom of the container 10 as required.

In the use and operation of the invention the head 21 is forced downwardly onto the bar 19 and the top cover 16 is forced over the top of the cylindrical wall 11. The sanitary container is then placed downwardly over animal exrement and rotated in a clockwise direction to cause the excrement to be picked up by the scraper blades 14 and forced through the slots 13 into the container 10. The vanes 15 assist in retaining the excrement within the container 10. After the container 10 is filled it is forced downwardly into the bottom cover 23 and the handle 20 is then removed. The container 10 with excrement therein is then discarded in any desired manner.

The materials from which the sanitary container is manufactured may include any inexpensive materials which will hold their shape and retain the excrement in the container after use. Such materials would include plastic, metal, and plasticized paper or cardboard.

Having thus described the preferred embodiments of the invention it should be understood that numerous structural modifications and adaptations may be resorted to without departing from the spirit of the invention.

I claim:

1. A disposable sanitary container for animal excrement comprising a side wall, a bottom wall secured to said side wall, a plurality of radially extending depending sloping scraper blades integrally formed in said bottom wall, said bottom wall having a plurality of radial slots formed therein adjacent each of said scraper blades, a retainer vane sloping upwardly from said bottom wall adjacent each of said slots, and means for rotating said bottom wall to move excrement upwardly through said slots into said container.

2. A device as claimed in claim 1 wherein said last named means includes an elongate handle and means for connecting said handle to said side wall.

3. A device as claimed in claim 2 wherein the means for connecting said handle to said side wall includes a top cover tightly engageable over said side wall, and means on said cover for detachably connecting said cover to said handle.

4. A device as claimed in claim 3 wherein the means for detachably connecting said cover to said handle includes a horizontally slotted head rigidly secured to the lower end of said handle and a transverse bar rigidly secured to said cover with said slot in said head being tightly engageable with said bar.

5. A device as claimed in claim 4 including a bottom cover tightly engageable over the bottom of said side wall to close the bottom of said sanitary container.

References Cited

UNITED STATES PATENTS 3,281,178  10/1966  Fisher _____ 294—1 R

FOREIGN PATENTS 169,800  6/1904  Germany _____ 294—50.7

EVON C. BLUNK, Primary Examiner

J. D. CHERRY, Assistant Examiner

U.S. Cl. X.R.

294—1 R, 50.7